United States Patent
Seaborn

(10) Patent No.: US 11,750,397 B2
(45) Date of Patent: Sep. 5, 2023

(54) ATTRIBUTE-BASED ENCRYPTION KEYS AS KEY MATERIAL FOR KEY-HASH MESSAGE AUTHENTICATION CODE USER AUTHENTICATION AND AUTHORIZATION

(71) Applicant: International Business Machines Corporation, Armonk, NY (US)

(72) Inventor: Mark Duane Seaborn, Algonquin, IL (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 17/140,446

(22) Filed: Jan. 4, 2021

(65) Prior Publication Data

US 2022/0217000 A1    Jul. 7, 2022

(51) Int. Cl.
*H04L 9/32* (2006.01)
*H04L 69/22* (2022.01)
*H04L 9/08* (2006.01)

(52) U.S. Cl.
CPC ............ *H04L 9/3242* (2013.01); *H04L 9/085* (2013.01); *H04L 9/0894* (2013.01); *H04L 9/3247* (2013.01); *H04L 69/22* (2013.01)

(58) Field of Classification Search
None
See application file for complete search history.

(56) References Cited

U.S. PATENT DOCUMENTS

| | | | | |
|---|---|---|---|---|
| 6,823,453 B1* | 11/2004 | Hagerman | .......... | H04L 63/1466 |
| | | | | 713/168 |
| 7,010,689 B1* | 3/2006 | Matyas, Jr. | ............... | H04L 9/08 |
| | | | | 713/168 |
| 10,079,686 B2* | 9/2018 | Camenisch | .......... | H04L 9/3268 |
| 2017/0353450 A1* | 12/2017 | Koved | .................. | H04L 63/045 |
| 2018/0123785 A1* | 5/2018 | Chen | ..................... | H04L 9/0869 |

(Continued)

OTHER PUBLICATIONS

Kolesnikov et al., "Attribute-based Key Exchange with General Policies," Proceedings of the 2016 ACM SIGSAC Conference on Computer and Communications Security, 2016, 35 pages.

(Continued)

*Primary Examiner* — Oleg Korsak
*Assistant Examiner* — Shadi H Kobrosli
(74) *Attorney, Agent, or Firm* — Yee & Associates, P.C.

(57) ABSTRACT

Resource user authentication and authorization is provided. An authentication code is generated based on using a retrieved attribute-based encryption user key as a secret key for a keyed-hash message authentication code digital signature over a set of header fields of a protected resource access request received from a client device of a resource user via a network. The generated authentication code is compared with an authentication code read within an embedded header field of the protected resource access request. It is determined whether a match exists between the generated authentication code and the authentication code read within the embedded header field. In response to determining that a match does exist, the resource user is authenticated. Decryption of an encrypted protected resource corresponding to the protected resource access request is performed using the retrieved attribute-based encryption user key corresponding to the resource user in response to authentication of the resource user.

20 Claims, 10 Drawing Sheets

(56) References Cited

U.S. PATENT DOCUMENTS

2018/0167216 A1* 6/2018 Walrant ............... H04L 9/0894
2022/0150066 A1* 5/2022 Sugarev ............... H04L 9/3263

OTHER PUBLICATIONS

Wang et al., "Attribute-based Signcryption with Ciphertext-policy and Claim-predicate Mechanism," 2011 Seventh International Conference on Computational Intelligence and Security, 5 pages.
Mell et al., "The NIST Definition of Cloud Computing," Computer Security Division, National Institute of Standards and Technology, Jan. 2011, 7 pages.
PCT International Search Report, dated Mar. 28, 2022, regarding Application No. PCT/CN2022/070110, 9 pages.

* cited by examiner

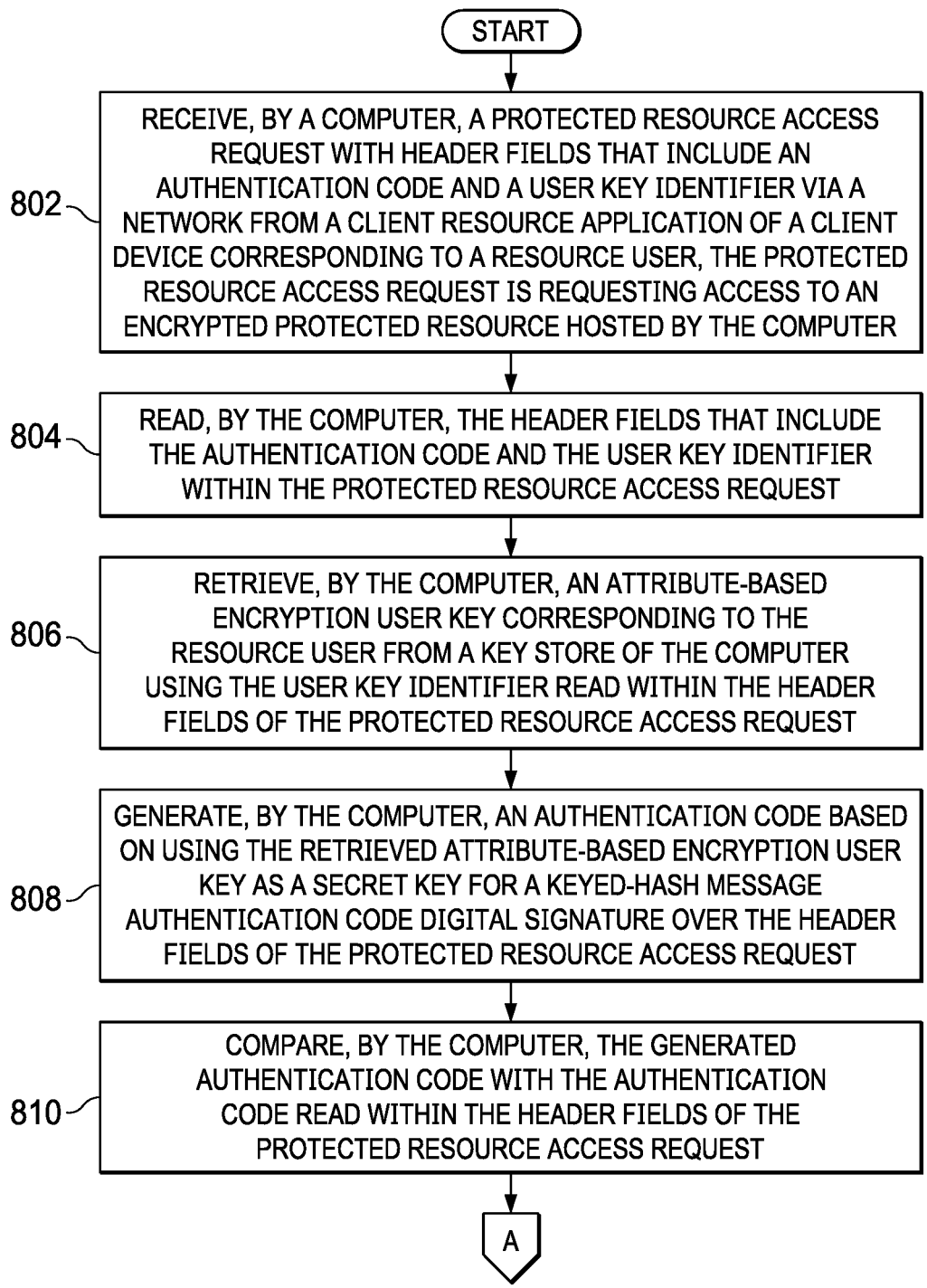

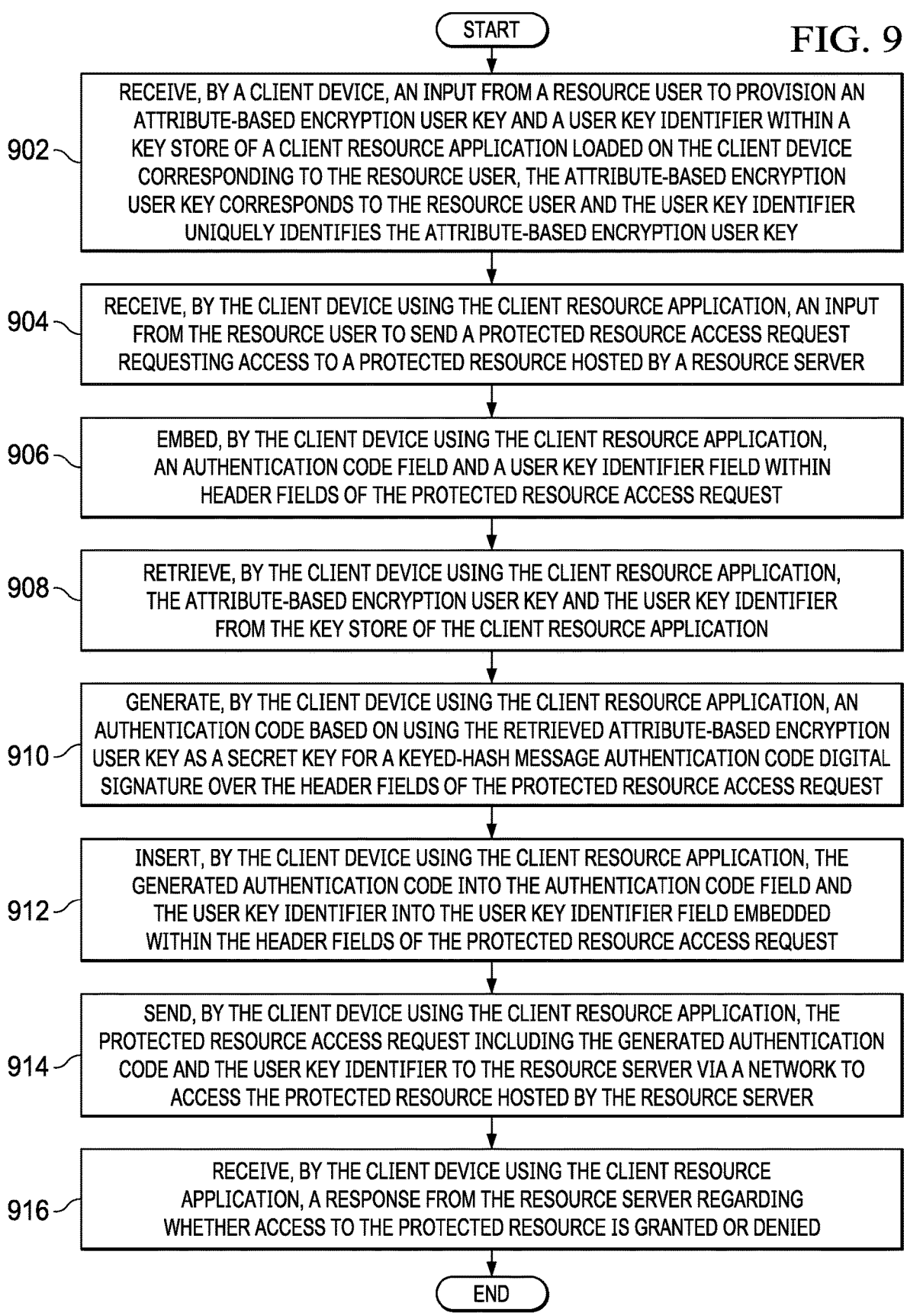

ATTRIBUTE-BASED ENCRYPTION KEYS AS KEY MATERIAL FOR KEY-HASH MESSAGE AUTHENTICATION CODE USER AUTHENTICATION AND AUTHORIZATION

BACKGROUND

1. Field

The disclosure relates generally to user authentication and authorization and more specifically to using an attribute-based encryption user key corresponding to a resource user as a secret key for a key-hash message authentication code digital signature over a set of header fields of a protected resource access request made by the resource user for user authentication and authorization.

2. Description of the Related Art

User authentication and authorization are critical components of network security. For example, authenticating a user's identity is a first step in providing control for accessing secure user accounts, performing secure transactions, accessing secure network resources, and the like, by a user. Authentication means confirming the user's identity, while authorization means granting permission to the user. In other words, authentication is the process of verifying who the user is, while authorization is the process of verifying what the user can perform or have access to. Authorization is the function of specifying access rights or privileges to secure or protected resources, which is related to access control. Authorization is defined by access control policies. During an authorization operation, the computer system uses the access control policies to determine whether protected resource access requests from authenticated users are approved (i.e., granted access) or disapproved (i.e., denied access). Protected resources can include, for example, data containing confidential or sensitive information, files, documents, software applications and programs, storage, processors, memory, network resources, and the like. Logically, authentication precedes authorization.

Network security consists of these access control policies adopted to prevent and monitor unauthorized access, misuse, modification, or denial of network-accessible protected resources. Typically, users choose or are assigned an identifier, such as a user name, and a password or other authenticating information that allows the users access to the network-accessible protected resources within the users' authority. For example, once authenticated, a firewall enforces the access control policies that define what protected resources on the network respective users are allowed to access.

SUMMARY

According to one illustrative embodiment, a computer-implemented method for resource user authentication and authorization is provided. A computer generates an authentication code based on using a retrieved attribute-based encryption user key as a secret key for a keyed-hash message authentication code digital signature over a set of header fields of a protected resource access request received from a client device of a resource user via a network. The computer compares the generated authentication code with an authentication code read within an embedded header field of the protected resource access request. The computer determines whether a match exists between the generated authentication code and the authentication code read within the embedded header field. In response to the computer determining that a match does exist between the generated authentication code and the authentication code read within the embedded header field, the computer authenticates the resource user. The computer performs decryption of an encrypted protected resource corresponding to the protected resource access request using the retrieved attribute-based encryption user key corresponding to the resource user in response to authentication of the resource user. According to other illustrative embodiments, a computer system and computer program product for resource user authentication and authorization are provided.

BRIEF DESCRIPTION OF THE DRAWINGS

FIGS. 8A-8B are a flowchart illustrating a process for a resource server in accordance with an illustrative embodiment; and FIG. 9 is a flowchart illustrating a process for a client resource application in accordance with an illustrative embodiment.

DETAILED DESCRIPTION

Figure 1:
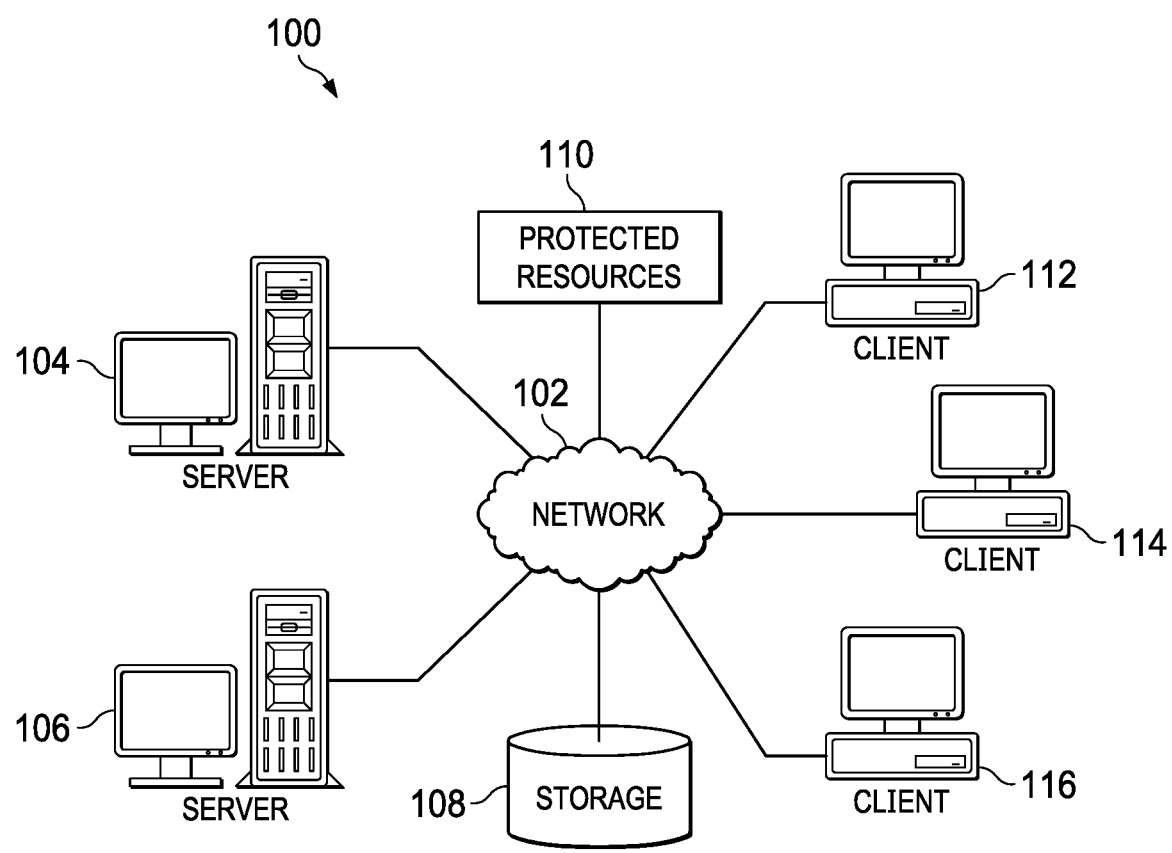
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-5, diagrams of data processing environments are provided in which illustrative embodiments may be implemented. It should be appreciated that FIGS. 1-5 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, resource server computers with high-speed connections to network 102. In addition, server 104 and server 106 may provide access management services to protected resources 110 by client devices. Protected resources 110 represent a set of protected resources hosted by server 104 and server 106. Protected resources 110 may represent any type of secured or safeguarded resource from unauthorized user access. For example, protected resources 110 include at least one of restricted access data, files, documents, software applications and programs, processors, memory, storage, network resources, and the like. Further, protected resources 110 are encrypted or the metadata corresponding to protected resources 110 are encrypted for increased security.

Also, it should be noted that server 104 and server 106 may each represent multiple computing nodes in one or more cloud environments managed by a protected resource access management service provider. Alternatively, server 104 and server 106 may each represent a cluster of servers in one or more data centers hosting the service. Furthermore, server 104 and server 106 may provide information, such as, for example, applications, programs, software updates, software fixes, files, data, and the like to client devices.

Client 112, client 114, and client 116 also connect to network 102. Clients 112, 114, and 116 are client devices of server 104 and server 106. In this example, clients 112, 114, and 116 are shown as desktop or personal computers with wire communication links to network 102. However, it should be noted that clients 112, 114, and 116 are examples only and may represent other types of data processing systems, such as, for example, laptop computers, handheld computers, smart phones, smart watches, smart televisions, smart glasses, smart appliances, gaming devices, and the like, with wire or wireless communication links to network 102. Users of clients 112, 114, and 116 may utilize clients 112, 114, and 116 to access and utilize protected resources 110 upon server 104 and/or server 106 authenticating the users and then determining whether the users are authorized to access protected resources 110.

Storage 108 is a network storage device capable of storing any type of data in a structured format or an unstructured format. In addition, storage 108 may represent a plurality of network storage devices. Further, storage 108 may store identifiers and network addresses for a plurality of different client devices, identifiers for a plurality of different resource users, protected resource access control policies, and the like.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 112 over network 102 for use on client 112.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
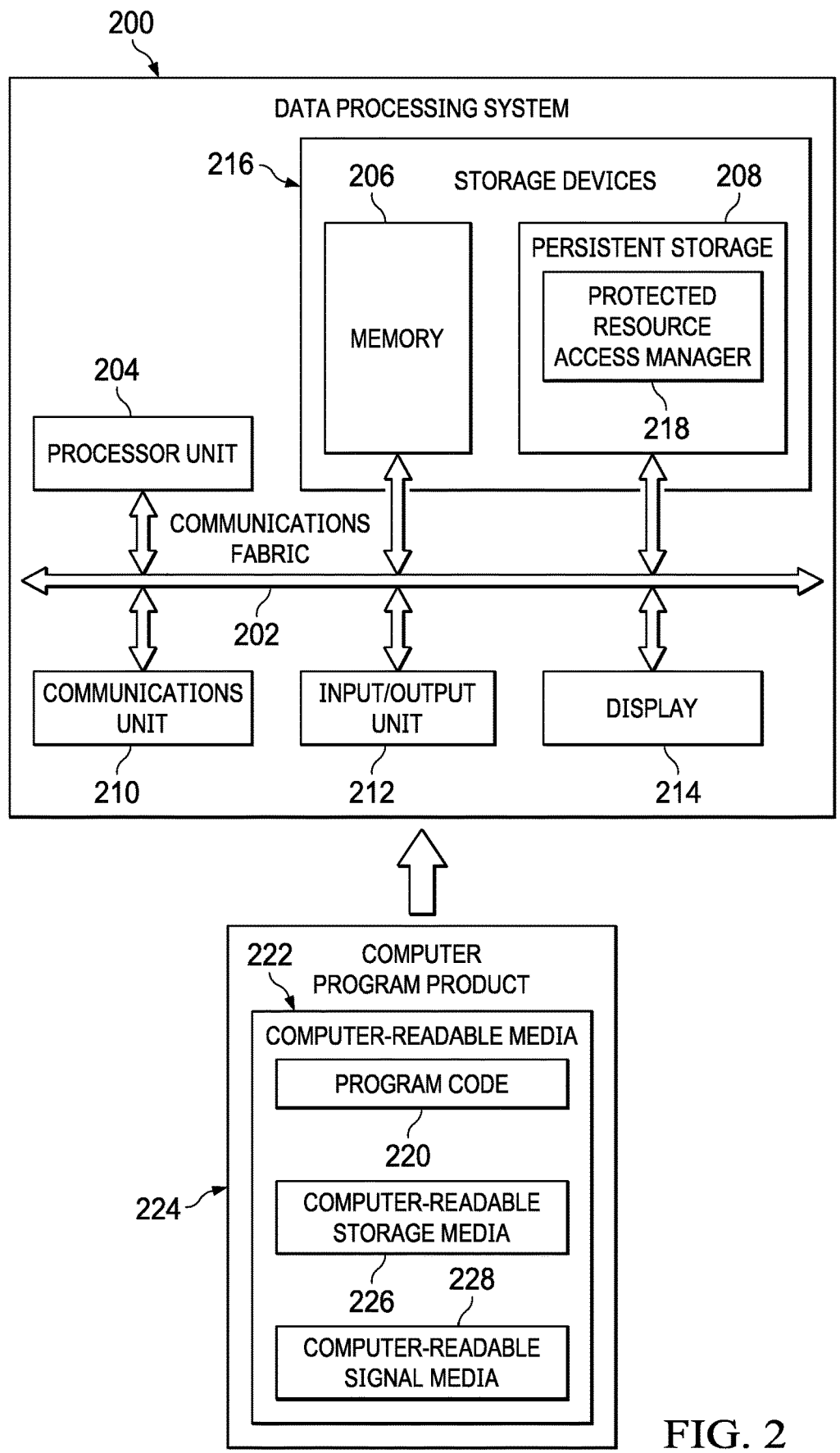
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing the protected resource access management processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores protected resource access manager 218. However, it should be noted that even though protected resource access manager 218 is illustrated as residing in persistent storage 208, in an alternative illustrative embodiment protected resource access manager 218 may be a separate component of data processing system 200. For example, protected resource access manager 218 may be a hardware component coupled to communication fabric 202 or a combination of hardware and software components. In another alternative illustrative embodiment, a first set of components of protected resource access manager 218 may be located in data processing system 200 and a second set of components of protected resource access manager 218 may be located in a second data processing system, such as, for example, server 106 in FIG. 1.

Protected resource access manager 218 controls resource user access to a set of protected resources, such as, for example, protected resources 110 in FIG. 1. Protected resource access manager 218 utilizes an attribute-based encryption user key as a secret cryptographic key to generate a key-hash message authentication code digital signature over a set of header fields of a protected resource access request made by a resource user requesting access to a particular protected resource in the set of protected resources. Protected resource access manager 218 compares the generated authentication code digital signature with an authentication code digital signature received in an embedded header field of the protected resource access request to authenticate the resource user. Upon authentication of the resource user by determining that a match exists between the authentication code digital signatures, protected resource access manager 218 utilizes the same attribute-based encryption user key used to generate the authentication code digital signature received in the embedded header field of the protected resource access request to decrypt the requested protected resource or metadata corresponding to the requested protected resource. If decryption is successful using that particular attribute-based encryption user key, then protected resource access manager 218 determines that the resource user is authorized to access that particular protected resource and grants access.

As a result, data processing system 200 operates as a special purpose computer system in which protected resource access manager 218 in data processing system 200 enables an increased level of access control and security to protected resources on a network. In particular, protected resource access manager 218 transforms data processing system 200 into a special purpose computer system as compared to currently available general computer systems that do not have protected resource access manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228.

In these illustrative examples, computer readable storage media 226 is a physical or tangible storage device used to store program code 220 rather than a medium that propagates or transmits program code 220. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 222" can be singular or plural. For example, program code 220 can be located in computer readable media 222 in the form of a single storage device or system. In another example, program code 220 can be located in computer readable media 222 that is distributed in multiple data processing systems. In other words, some instructions in program code 220 can be located in one data processing system while other instructions in program code 220 can be located in one or more other data processing systems. For example, a portion of program code 220 can be located in computer readable media 222 in a server computer while another portion of program code 220 can be located in computer readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
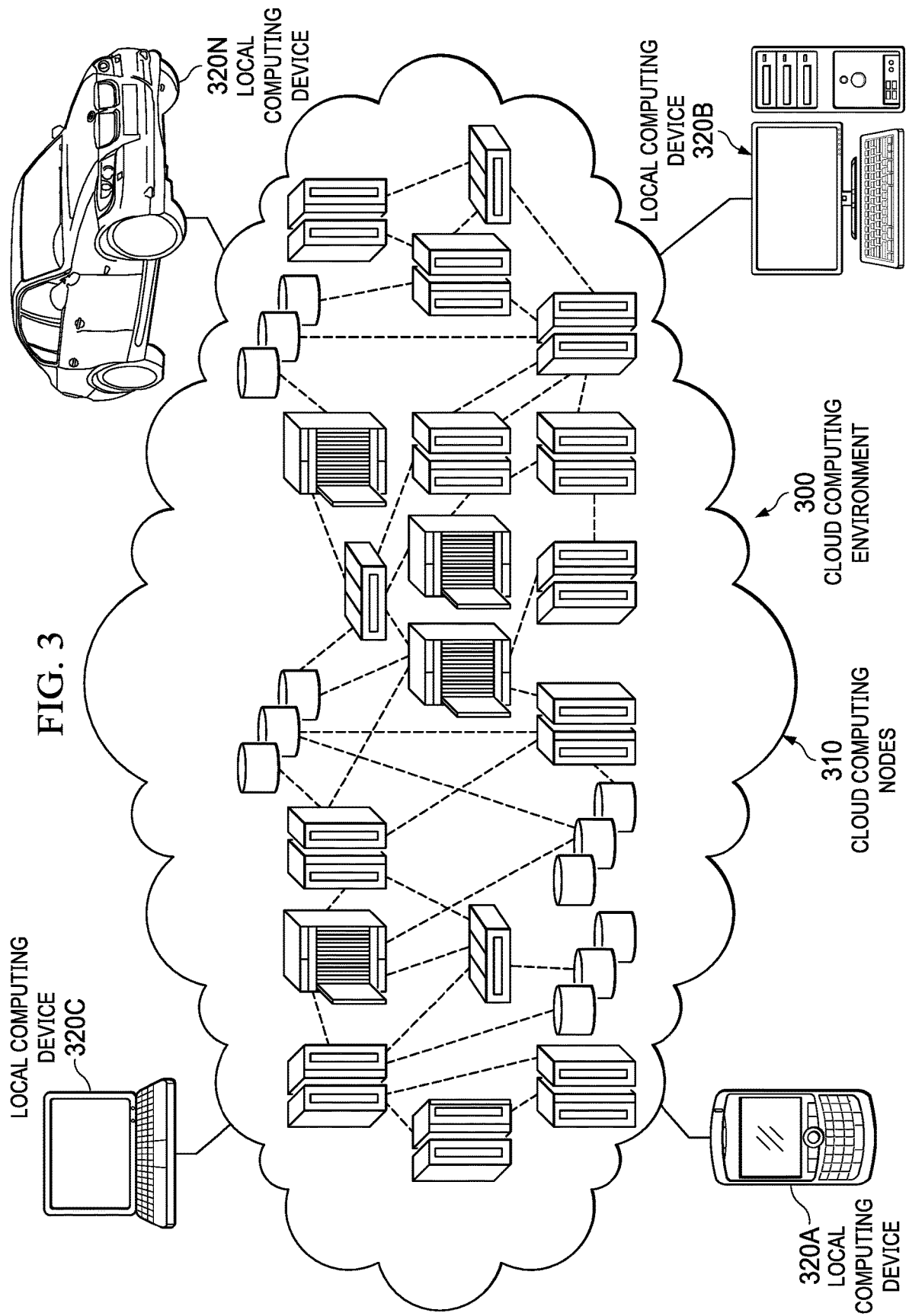
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 112-116 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
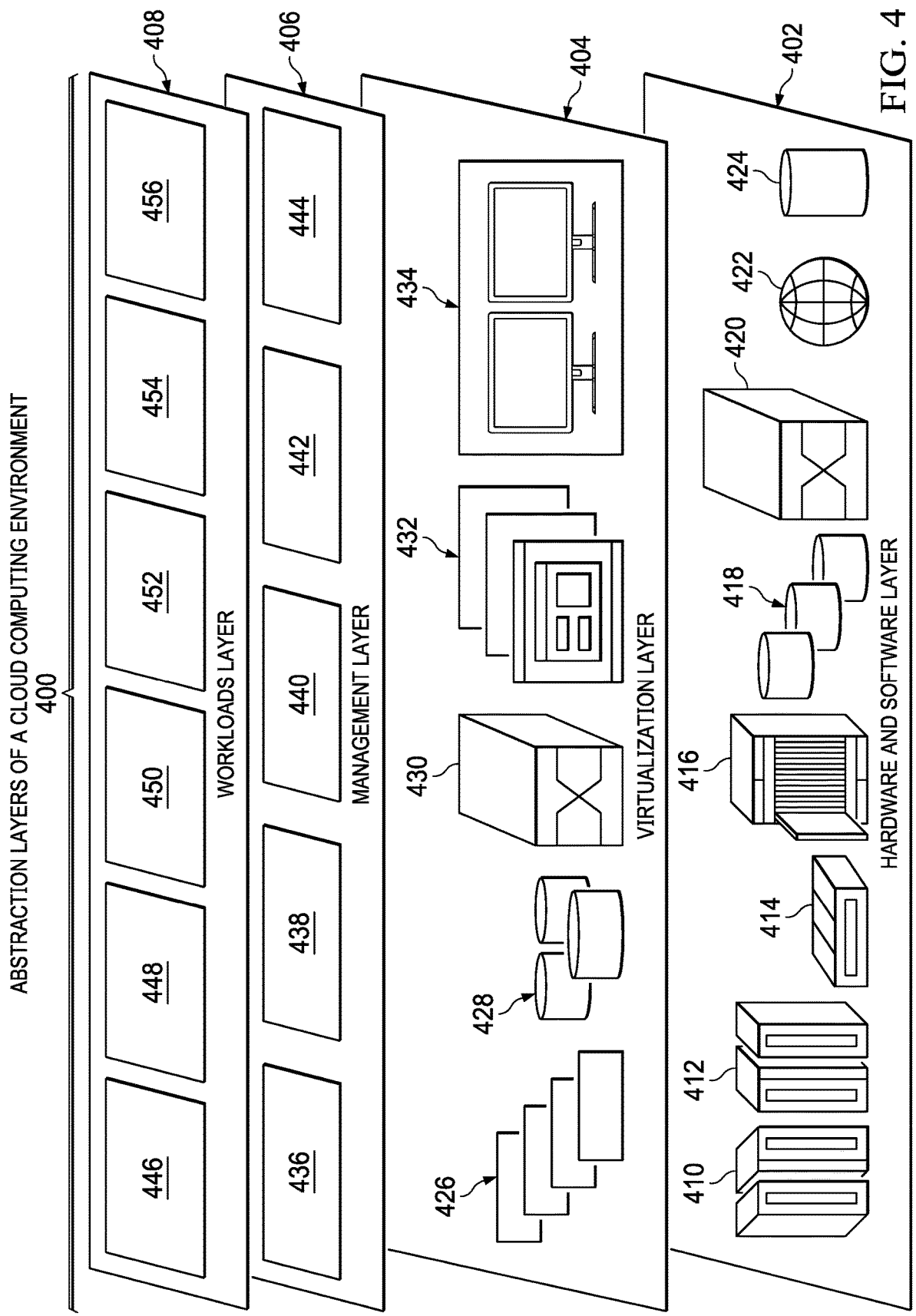
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and protected resource access management 456.

Computer systems that share protected resources, such as confidential data, between service providers and customers (i.e., resource users) are numerous on the Internet today. One challenging issue of this provider/customer model is user authentication and authorization. There are a number of ways to implement user authentication and authorization. However, some of the newer methods allow the implementation to protect the access control policies by encrypting the access control policies, along with the protected data using functional encryption.

One of these newer methods is attribute-based encryption where protected data are encrypted and made available to any user and the implementation relies on the cryptographic strength of the algorithm to obfuscate the protected data and Boolean predicates (e.g., access control policies) encrypted within the ciphertext as protection against unauthorized user access of the protected data. Attribute-based encryption is a type of public-key encryption in which a secret cryptographic key of a user and ciphertext are dependent upon attributes of the user, such as, for example, the geographic location where the user works, job title of the user, job roles of the user, resource group the user is a member of, security level of the user, and the like. In attribute-based encryption, the decryption of the ciphertext is possible only if the set of attributes of the user key matches the attributes of the ciphertext. There are two main types of attribute-based encryption techniques: 1) key-policy attribute-based encryption; and 2) ciphertext-policy attribute-based encryption.

However, many in the network security industry require more control over the protected resource, even in an encrypted form. In their view, the protected resource, encrypted or not, should be inaccessible to anyone not authorized to access and use that particular protected resource. Illustrative embodiments ensure that protected resources are not accessible to anyone without authorization to use those protected resources.

Preventing unauthorized users from accessing protected resources in any form introduces a need for resource users to present credentials to the resource server hosting those protected resources. Specifically, users must present credentials proving that the users have been granted the right to access a particular protected resource. A number of issues arise with the need for a resource user to prove that the resource user is authorized to access and use a given protected resource. Illustrative embodiments take into account and address how to securely present the resource user's credential to the resource server to control access to protected resources on a network.

Consider a number of existing authentication methods that have been used in the past, such as, for example, basic auth and OAuth. These existing authentication methods require that the user's credential be passed over the network to start a network session. As a result, these existing authentication methods expose the user's credential to the network each time a network session is initiated by the user.

However, a number of other methods have been created to protect this credential exchange over the network, such as, for example, Transport Layer Security. In a system that uses attribute-based encryption for access control, a user can simply pass the user key in one of a number of different methods and then have the resource server use that user key to try to unlock a particular protected resource. If the resource server is able to unlock (e.g., decrypt) the protected resource using that particular user key, then the resource server knows that the user is in possession of a credential that grants access to that particular protected resource. However, attribute-based encryption suffers from a major drawback. Attribute-based encryption exposes the user key to the network for each network session. For example, if there is a break down in the Transport Layer Security protocol, then the user key could be exposed on the network and subsequently utilized by an unauthorized user.

Other existing methods of proving resource users are in possession of credentials to access protected resources do not require that the protected resource be passed over the network at the start of a network session. One such method is key-hash message authentication code. Keyed-hash message authentication code (also known as hash-based message authentication code) is a specific type of message authentication code involving a cryptographic hash function and a secret cryptographic key. Keyed-hash message authentication code may be used to simultaneously verify data integrity and authenticity of a message. Any cryptographic hash function, such as secure hash algorithm 2 or secure hash algorithm 3, may be used in the calculation of a keyed-hash message authentication code. The keyed-hash message authentication code allows resource servers that also possess the secret key to detect any changes to the message content. In other words, the key-hash message authentication code provides the resource server hosting one or more protected resources with the means of testing whether a resource user is in possession of a credential (i.e., a user key) by having a resource application, which corresponds to the resource user, compute the key-hash message authentication code over a set of network header fields of the protected resource access request and include that key-hash message authentication code (i.e., cryptographic digital signature) in an embedded field in the header of the protected resource access request.

Upon receiving the protected resource access request from the resource user, the resource server hosting the protected resource can calculate the same key-hash message authentication code over the same set of header fields of the protected resource access request using that same user key as the resource application of the resource user. If the two key-hash message authentication codes (i.e., cryptographic digital signatures) match, then the resource server has cryptographically proven that the user is in possession of the user key (i.e., valid user credential) and is granted access to the protected resource.

Thus, illustrative embodiments utilize an attribute-based encryption user key as the secret key for the key-hash message authentication code cryptographic digital signature over the same set of header fields of the protected resource access request to prove to the resource server that the resource user is in possession of a pre-shared attribute-based encryption user key. It should be noted that illustrative embodiments can utilize any form of attribute-based encryption, such as key-policy attribute-based encryption, ciphertext-policy attribute-based encryption, or the like.

Illustrative embodiments issue the resource user an attribute-based encryption user key out-of-band, along with a unique user key identifier corresponding to that particular user key. Illustrative embodiments provision that same attribute-based encryption user key and unique user key identifier on the resource server as well. It should be noted that illustrative embodiments may utilize any type of out-of-band encryption key sharing technique. Out-of-band encryption key sharing occurs when a cryptographic secret key is delivered by a means that is inaccessible from inside the network the cryptographic secret key will be used in. In other words, out-of-band encryption key sharing means sending the cryptographic secret key via another means of communication than the one used to exchange ciphertexts.

After illustrative embodiments share the attribute-based encryption user key and corresponding unique user key identifier with the resourced user and resource server, illustrative embodiments utilize standard attribute-based encryption functionality to encrypt protected resources or resource metadata with access control policies embedded in the cyphertext and placed on the resource server. Once the resource server authenticates (i.e., validates) a user corresponding to a protected resource access request using the key-hash message authentication code, the resource server utilizes the corresponding attribute-based encryption user key to attempt to decrypt the protected resource or metadata corresponding to the protected resource. If the decryption is successful using that attribute-based encryption user key, then the resource server knows that the user making the protected resource access request is in possession of the attribute-based encryption user key that gives that user authorization to access that particular protected resource.

Thus, illustrative embodiments provide one or more technical solutions that overcome a technical problem with securely presenting resource user credentials to a resource server to control access to protected resources on a network. As a result, these one or more technical solutions provide a technical effect and practical application in the field of network security.

Figure 5:
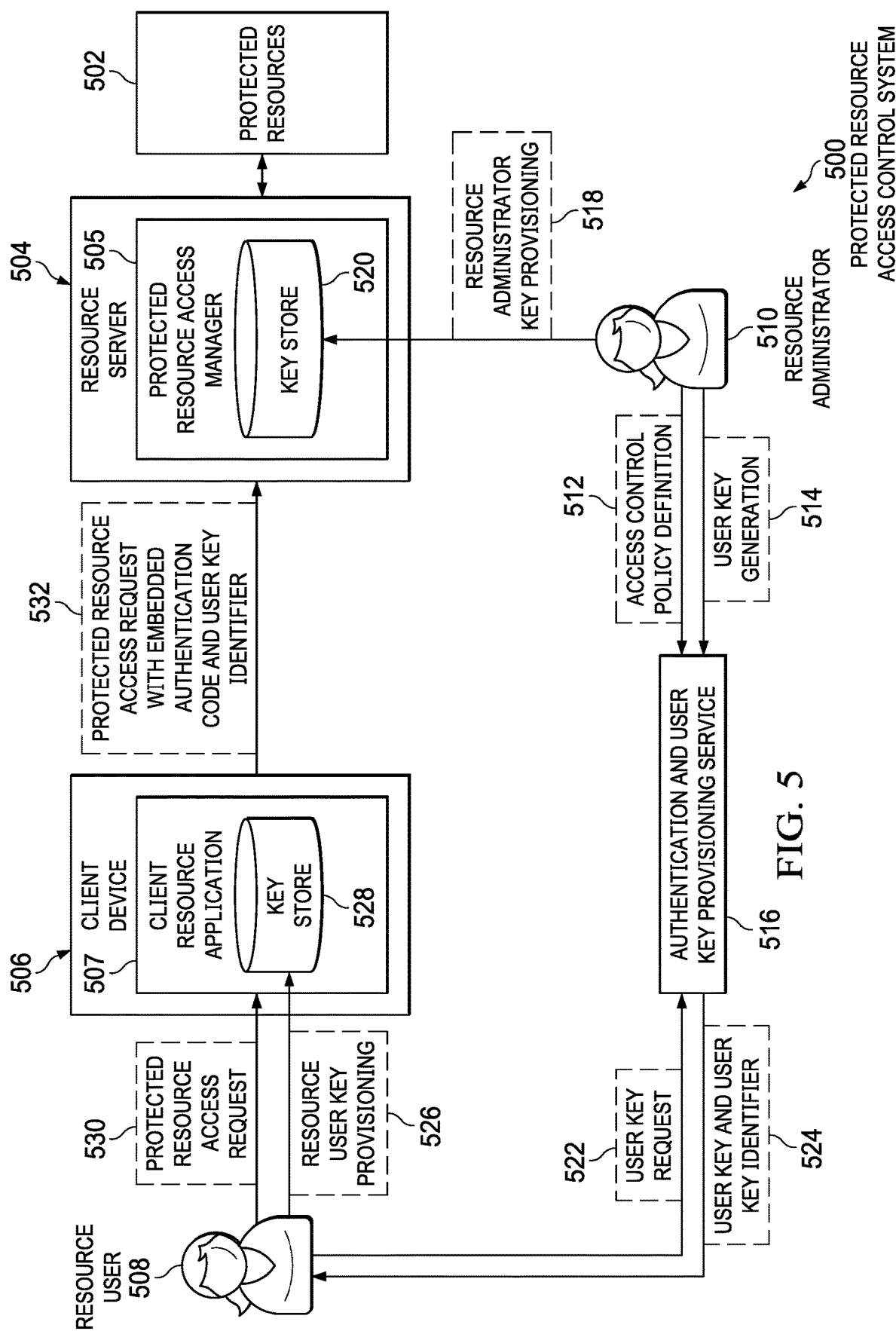
FIG. 5 is a diagram illustrating an example of a protected resource access control system in accordance with an illustrative embodiment.

With reference now to FIG. 5, a diagram illustrating an example of a protected resource access control system is depicted in accordance with an illustrative embodiment. Protected resource access control system 500 may be implemented in a network of data processing systems, such as network data processing system 100 in FIG. 1, or a cloud computing environment, such as cloud computing environment 300 in FIG. 3. Protected resource access control system 500 is a system of hardware and software components for controlling access to protected resources 502. Protected resources 502 represent a set of protected resources and may be, for example, protected resources 110 in FIG. 1.

In this example, protected resource access control system 500 includes resource server 504 and client device 506. Resource server 504 may be, for example, server 104 in FIG. 1, data processing system 200 in FIG. 2, or a cloud computing node of cloud computing nodes 310 in FIG. 3. Client device 506 may be, for example, client 112 in FIG. 1 or local computing device 320B in FIG. 3. However, it should be noted that protected resource access control system 500 is intended as an example only and not as a limitation on illustrative embodiments. In other words, protected resource access control system 500 may include any number of protected resources, resource servers, client devices, and other devices and components not shown.

User key provisioning system 500 also illustrates one set of possible provisioning entities and a workflow that allows key-hash message authentication codes to enable controlled protected resource access using attribute-based encryption user keys. However, it should be noted that the illustrative example of FIG. 5 is not meant to illustrate all ways to enable user key sharing. In other words, alternative illustrative embodiments may utilize other user key sharing methodologies.

In this example, resource server 504 includes protected resource access manager 505, such as, for example, protected resource access manager 218 in FIG. 2. Protected resource access manager 505 controls user access to protected resources 502, which are hosted by resource server 504. Client device 506 includes client resource application 507. Resource user 508 utilizes client resource application 507 to access and utilize one or more of protected resources 502.

Resource administrator 510 is responsible for administratively managing access to protected resources 502. At 512, resource administrator 510 creates access control policy definitions that define which resource users or resource user groups can access which particular protected resources of protected resources 502. In addition, resource administrator 510, using one of the attribute-based encryption protocols, encrypts protected resources 502 or metadata corresponding to protected resources 502 to securely control access to protected resources 502. Further, at 514, resource administrator 510 generates an attribute-based encryption user key for resource user 508, which resource user 508 will utilize to access one or more of protected resources 502. Furthermore, resource administrator 510 generates a unique user key identifier, which uniquely identifies the attribute-based encryption user key corresponding to resource user 508.

Resource administrator 510 sends the attribute-based encryption user key corresponding to resource user 508 and the unique user key identifier to authentication and user key provisioning service 516. At 518, resource administrator 510 also provisions the attribute-based encryption user key and unique user key identifier in key store 520 of protected resource access manager 505 on resource server 504 for testing a key-hash message authentication code digital signature embedded in a header field of a protected resource access request.

At 522, resource user 508 requests the attribute-based encryption user key and unique user key identifier from authentication and user key provisioning service 516. At 524, in response to receiving the request, authentication and user key provisioning service 516 sends the attribute-based encryption user key and unique user key identifier out-of-band to resource user 508. At 526, resource user 508 provisions the attribute-based encryption user key and unique user key identifier in key store 528 of client resource application 507 on client device 506.

At 530, resource user 508 inputs a protected resource access request into client resource application 507 requesting access to one or more of protected resources 502. In response to receiving the protected resource access request input, client resource application 507 generates the protected resource access request, which includes a key-hash message authentication code and unique user key identifier, using the attribute-based encryption user key and unique user key identifier provisioned in key store 528. At 532, client resource application 507 sends the protected resource access request including the key-hash message authentication code and unique key identifier to resource server 504.

Afterward, protected resource access manager 505 of resource server 504 uses the unique user key identifier included in the protected resource access request to retrieve the pre-shared attribute-based encryption user key from key store 520 of protected resource access manager 505. Protected resource access manager 505 utilizes that attribute-based encryption user key retrieved from key store 520 to generate its own key-hash message authentication code over the same set of header fields of the protected resource access request. Protected resource access manager 505 then compares the key-hash message authentication code generated by protected resource access manager 505 with the key-hash message authentication code included in the protected resource access request sent by client resource application 507.

If the key-hash message authentication codes do not match, then protected resource access manager 505 denies resource user 508 access to the one or more requested protected resources of protected resources 502. If both key-hash message authentication codes match, then protected resource access manager 505 authenticates resource user 508. After protected resource access manager 505 authenticates resource user 508, protected resource access manager 505 utilizes the attribute-based encryption user key to attempt to decrypt the one or more protected resources of protected resources 502 that correspond to the protected resource access request of resource user 508. If protected resource access manager 505 is able to decrypt the one or more protected resources using the attribute-based encryption user key, then protected resource access manager 505 determines that resource user 508 is authorized to access the one or more protected resources and is granted access. If protected resource access manager 505 is unable to decrypt the one or more protected resources, then protected resource access manager 505 determines that resource user 508 is not authorized to access those one or more protected resources and is denied access.

Figure 6:
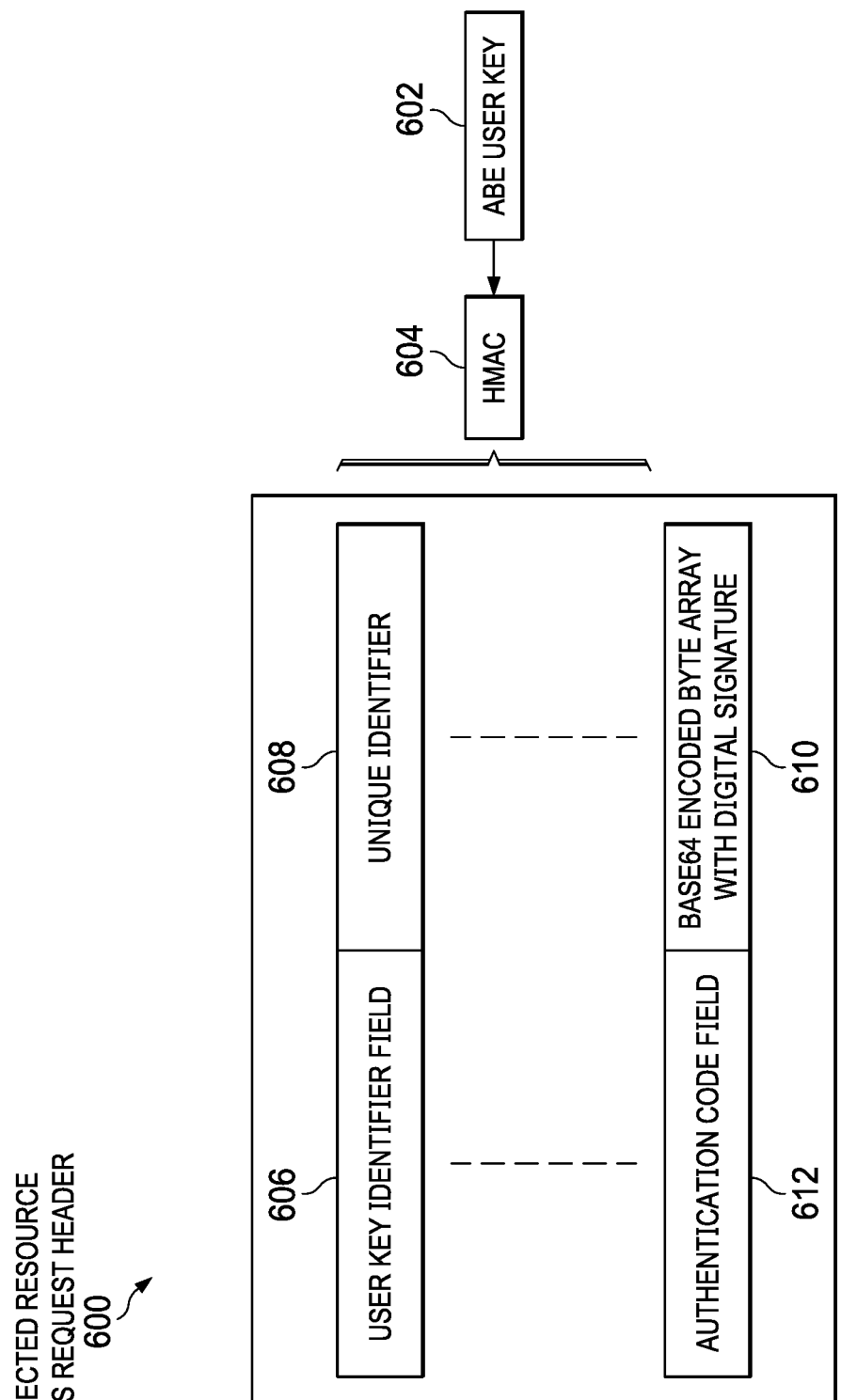
FIG. 6 is a diagram illustrating an example of a protected resource access request header in accordance with an illustrative embodiment.

With reference now to FIG. 6, a diagram illustrating an example of a protected resource access request header is depicted in accordance with an illustrative embodiment. Protected resource access request header 600 illustrates embedded fields in a protected resource access request that a protected resource access manager, such as, for example, protected resource access manage 218 in FIG. 2 or protected resource manager 505 in FIG. 5, reads to retrieve attribute-based encryption user key 602 to generate key-hash message authentication code digital signature 604 over a set of header fields, which does not include the authentication code and digital signature, of the protected resource access request.

However, it should be noted that protected resource access request header 600 is intended as an example only. In other words, protected resource access request header 600 does not illustrate all header fields, such as, for example, fields that suppress malicious user behavior (e.g., replay attacks). This set of other header fields not illustrated, does not negatively impact the functionality of the protected resource access manager of illustrative embodiments. This set of other header fields, which is in addition to the embedded header fields, are implied by the dotted lines below User Key Identifier Field 606. Additionally, names of the header fields are not important, but only the content of the fields.

The protected resource access manager utilizes unique identifier 608 contained in User Key Identifier Field 606 to retrieve attribute-based encryption user key 602, which corresponds to a resource user making the protected resource access request (e.g., resource user 508 in FIG. 5), that was provisioned by a resource administrator, such as resource administrator 510 in FIG. 5, in a key store, such as key store 520 in FIG. 5, of the protected resource access manager. Unique identifier 608 uniquely identifies attribute-based encryption user key 602 in the key store. The protected resource access manager compares generated key-hash message authentication code digital signature 604 with Base64 encoded byte array with digital signature 610 contained in Authentication Code Field 612 to authenticate the resource user.

Figure 7:
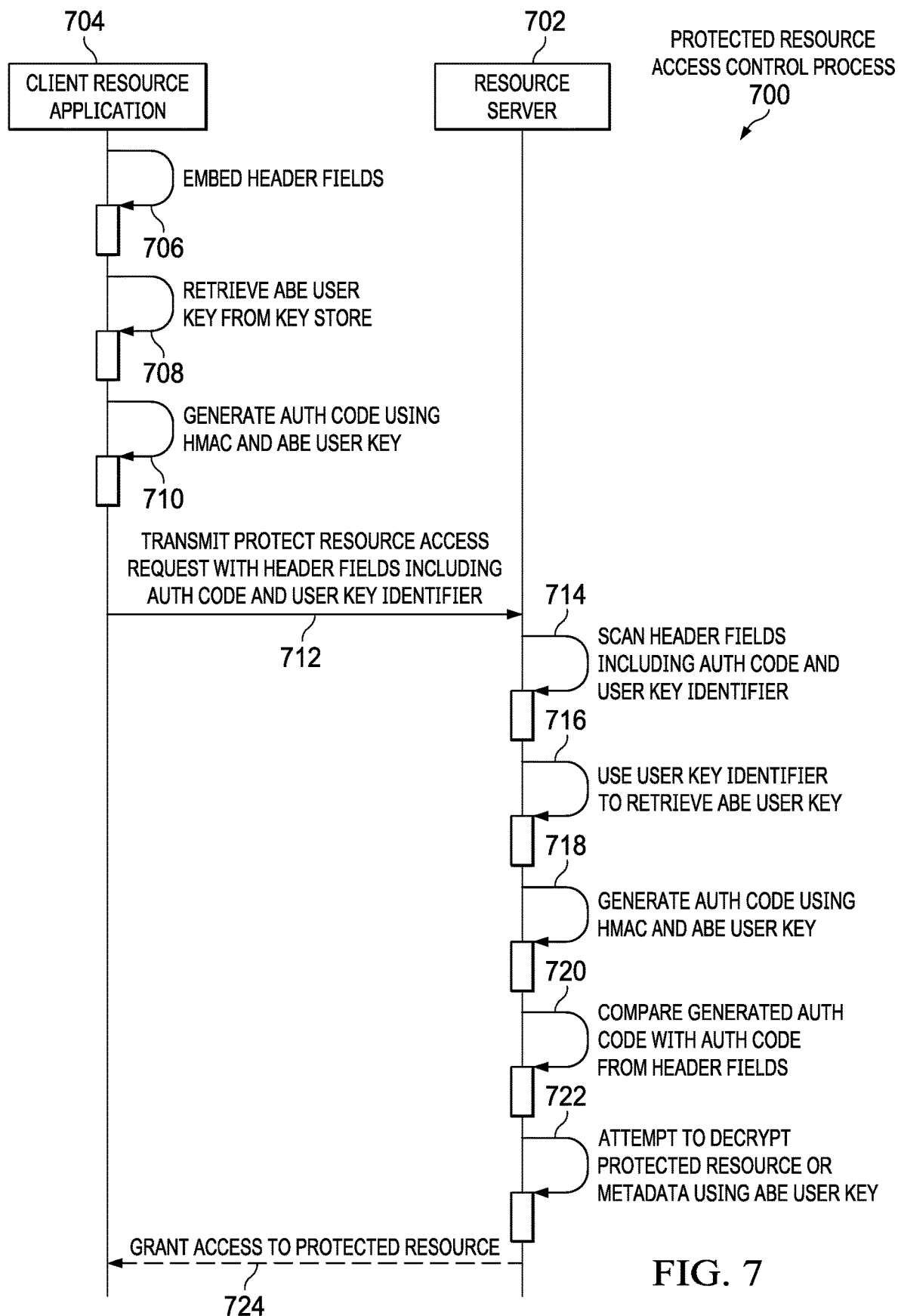
FIG. 7 is a diagram illustrating an example of a protected resource access control process in accordance with an illustrative embodiment.

With reference now to FIG. 7, a diagram illustrating an example of a protected resource access control process is depicted in accordance with an illustrative embodiment. Protected resource access control process 700 includes resource server 702 and client resource application 704.

Resource server 702 may be, for example, resource server 504 in FIG. 5. Client resource application 704 may be, for example, client resource application 507 loaded on client device 506 in FIG. 5.

Protected resource access control process 700 starts when a resource user, such as, for example, resource user 508 in FIG. 5, provisions an attribute-based encryption user key and unique user key identifier in a key store, such as, for example, key store 528 in FIG. 5, of client resource application 704. Subsequently, client resource application 704 receives a protected resource access request from the resource user requesting access to a protected resource hosted by resource server 702. In response, at 706, client resource application 704 embeds a User Key Identification Field and an Authentication Code Field in a header of the protected resource access request, such as, for example, User Key Identification Field 606 and Authentication Code Field 612 embedded in protected resource access request header 600 in FIG. 6.

Further, at 708, client resource application 704 retrieves the attribute-based encryption key and the unique user key identifier from the key store of client resource application 704. At 710, client resource application 704 generates an authentication code based on using the attribute-based encryption key as the secret key for a key-hash message authentication code digital signature over a set of header fields of the protected resource access request. Afterward, client resource application 704 inserts the authentication code into the Authentication Code Field of the protected resource access request header and the unique user key identifier into the User Key Identification Field. It should be noted that alternative illustrative embodiments may place the unique user key identifier in a digitally signed header field as well. This would protect the unique user key identifier and fail the authentication code if the unique user key identifier was not included in a header field that was not digitally signed. At 712, client resource application 704 transmits the protected resource access request that includes the authentication code and unique user key identifier to resource server 702.

At 714, in response to resource server 702 receiving the protected resource access request, resource server 702 scans the header fields to find the unique user key identifier corresponding to the attribute-based encryption user key. At 716, resource server 702 uses the unique user key identifier to retrieve a pre-shared attribute-based encryption user key from a key storage, such as, for example, key storage 520 in FIG. 5, of resource server 702. At 718, resource server 702 utilizes the pre-shared attribute-based encryption user key as the secret key for its own key-hash message authentication code digital signature over the same set of header fields of the protected resource access request that client resource application 704 used to generate its own authentication code.

At 720, resource server 702 compares the authentication code generated by resource server 702 with the authentication code read from the header fields of the protected resource access request sent by client resource application 704. If the authentication codes match, then resource server 702 knows that the resource user is in possession of the same attribute-based encryption user key stored in the key store of resource server 702. After resource server 702 authenticates the resource user by determining that the authentication codes match, at 722, resource server 702 utilizes the attribute-based encryption user key to attempt to decrypt the protected resource or protected resource metadata corresponding to the protected resource access request. If resource server 702 is able to decrypt the protected resource or protected resource metadata, then resource server 702 knows that the resource user is authorized to access the protected resource and is granted access at 724.

It should be noted that protected resource access control process 700 prevents the attribute-based encryption user key from being exposed to the network and provides resource server 702 a means of authorizing protected resource usage. Protected resource access control process 700 may also provide a means of controlling protected resource access with both authorization for download, as well as encryption for viewing.

Figure 8B:
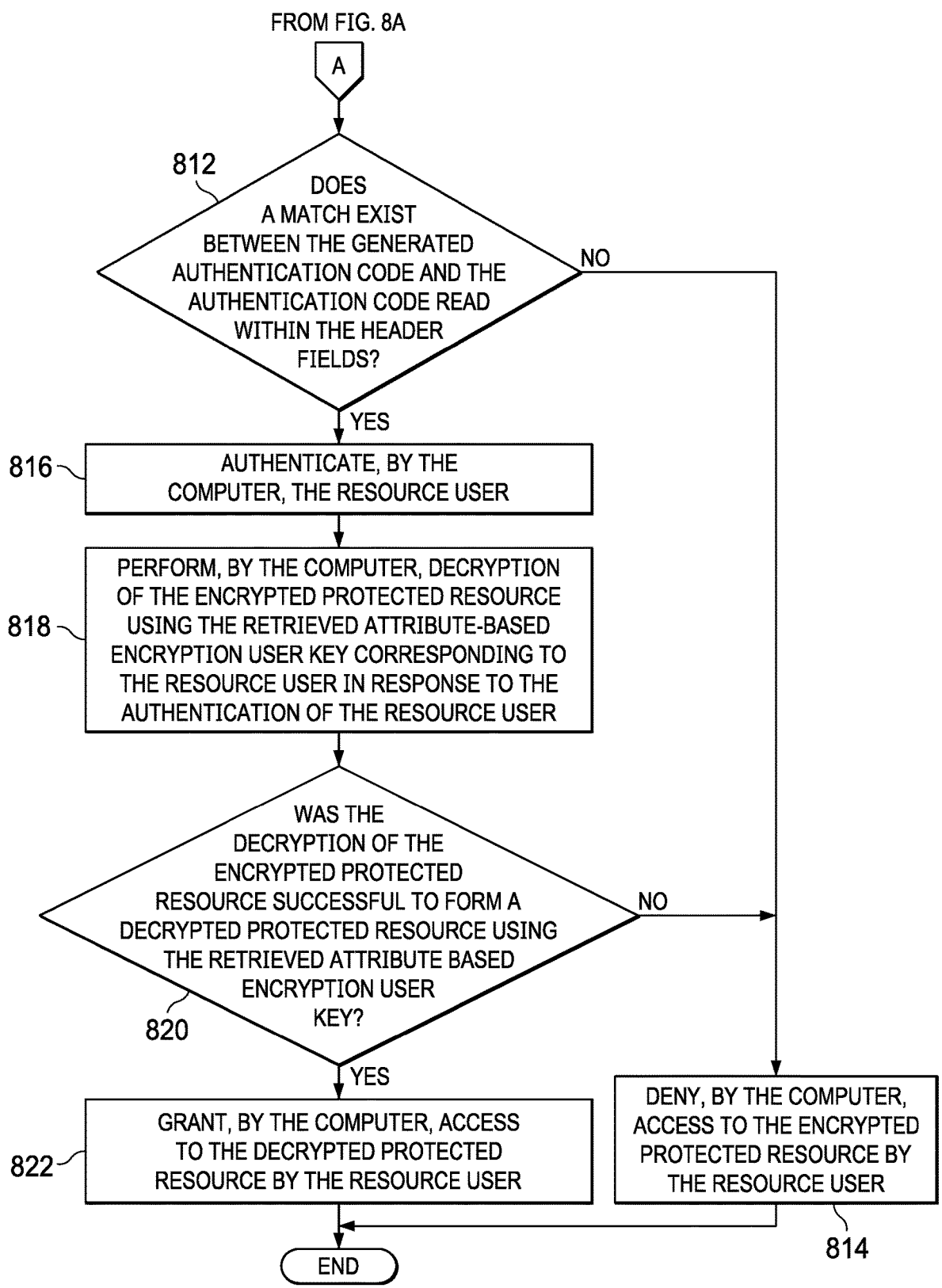

With reference now to FIGS. 8A-8B, a flowchart illustrating a process for a resource server is shown in accordance with an illustrative embodiment. The process shown in FIGS. 8A-8B may be implemented in a computer, such as, for example, server 104 in FIG. 1, data processing system 200 in FIG. 2, a cloud computing node of cloud computing nodes 310 in FIG. 3, or resource server 504 in FIG. 5. For example, the process shown in FIGS. 8A-8B may be implemented in protected resource access manager 218 in FIG. 2 or protected resource access manager 534 in FIG. 3.

The process begins when the computer receives a protected resource access request with header fields that include an authentication code and a user key identifier via a network from a client resource application of a client device corresponding to a resource user (step 802). The protected resource access request is requesting access to an encrypted protected resource hosted by the computer. In response to receiving the protected resource access request, the computer reads the header fields that include the authentication code and the user key identifier within the protected resource access request (step 804).

Afterward, the computer retrieves an attribute-based encryption user key corresponding to the resource user from a key store of the computer using the user key identifier read within the header fields of the protected resource access request (step 806). In addition, the computer generates an authentication code based on using the retrieved attribute-based encryption user key as a secret key for a keyed-hash message authentication code digital signature over the header fields of the protected resource access request (step 808). The computer compares the generated authentication code with the authentication code read within the header fields of the protected resource access request (step 810).

Subsequently, the computer makes a determination as to whether a match exists between the generated authentication code and the authentication code read with the header fields (step 812). If the computer determines that a match does not exist between the generated authentication code and the authentication code read within the header fields, no output of step 812, then the computer does not authenticate the resource user and denies access to the encrypted protected resource by the resource user (step 814). Thereafter, the process terminates. If the computer determines that a match does exist between the generated authentication code and the authentication code read with the header fields, yes output of step 812, then the computer authenticates the resource user (step 816).

Afterward, the computer performs decryption of the encrypted protected resource using the retrieved attribute-based encryption user key corresponding to the resource user in response to the authentication of the resource user (step 818). The computer makes a determination as to whether the decryption of the encrypted protected resource was successful to form a decrypted protected resource using the retrieved attribute-based encryption user key (step 820).

If the computer determines that the decryption of the encrypted protected resource was unsuccessful using the retrieved attribute-based encryption user key, no output of step 820, then the process returns to step 814 where the computer determines the resource user is not authorized and denies access to the encrypted protected resource by the resource user. If the computer determines that the decryption of the encrypted protected resource was successful to form a decrypted protected resource using the retrieved attribute-based encryption user key, yes output of step 820, then the computer determines the resource user is authorized and grants access to the decrypted protected resource by the resource user (step 822). Thereafter, the process terminates.

With reference now to FIG. 9, a flowchart illustrating a process for a client resource application is shown in accordance with an illustrative embodiment. The process shown in FIG. 9 may be implemented in a client resource application, such as, for example, client resource application 506 in FIG. 5 or client resource application 704 in FIG. 7. The client resource application may be implemented in client device, such as, for example, client 112 in FIG. 2 or local computing device 302A in FIG. 3.

The process begins when the client device receives an input from a resource user to provision an attribute-based encryption user key and a user key identifier within a key store of a client resource application loaded on the client device corresponding to the resource user (step 902). The attribute-based encryption user key corresponds to the resource user. Also, the user key identifier uniquely identifies the attribute-based encryption user key.

Subsequently, the client device, using the client resource application, receives an input from the resource user to send a protected resource access request requesting access to a protected resource hosted by a resource server (step 904). In response to receiving the input to send the protected resource access request, the client device, using the client resource application, embeds an authentication code field and a user key identifier field within header fields of the protected resource access request (step 906). In addition, the client device, using the client resource application, retrieves the attribute-based encryption user key and the user key identifier from the key store of the client resource application (step 908).

Afterward, the client device, using the client resource application, generates an authentication code based on using the retrieved attribute-based encryption user key as a secret key for a keyed-hash message authentication code digital signature over the header fields of the protected resource access request (step 910). Further, the client device, using the client resource application, inserts the generated authentication code into the authentication code field and the user key identifier into the user key identifier field embedded within the header fields of the protected resource access request (step 912).

The client device, using the client resource application, sends the protected resource access request including the generated authentication code and the user key identifier to the resource server via a network to access the protected resource hosted by the resource server (step 914). Subsequently, the client device, using the client resource application, receives a response from the resource server regarding whether access to the protected resource is granted or denied (step 916). Thereafter, the process terminates.

Thus, illustrative embodiments of the present invention provide a computer-implemented method, computer system, and computer program product for using an attribute-based encryption user key corresponding to a resource user as a secret key for a key-hash message authentication code digital signature over a set of header fields of a protected resource access request made by the resource user for user authentication and authorization. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for resource user authentication and authorization, the computer-implemented method comprising:
   generating, by a computer, an authentication code based on using a retrieved attribute-based encryption user key as a secret key for a keyed-hash message authentication code digital signature over a set of header fields of a protected resource access request received from a client device of a resource user via a network;
   comparing, by the computer, the generated authentication code with an authentication code read within an embedded header field of the protected resource access request;
   determining, by the computer, whether a match exists between the generated authentication code and the authentication code read within the embedded header field;
   responsive to the computer determining that a match does exist between the generated authentication code and the authentication code read within the embedded header field, authenticating, by the computer, the resource user; and
   performing, by the computer, decryption of an encrypted protected resource corresponding to the protected resource access request using the retrieved attribute-based encryption user key corresponding to the resource user in response to authentication of the resource user.

2. The computer-implemented method of claim 1 further comprising:
   determining, by the computer, whether the decryption of the encrypted protected resource was successful to form a decrypted protected resource using the retrieved attribute-based encryption user key;
   responsive to the computer determining that the decryption of the encrypted protected resource was successful to form a decrypted protected resource using the retrieved attribute-based encryption user key, determining, by the computer, that the resource user is authorized to access the decrypted protected resource and granting access; and
   responsive to the computer determining that the decryption of the encrypted protected resource was unsuccessful using the retrieved attribute-based encryption user key, determining, by the computer, that the resource user is not authorized to access the encrypted protected resource and denying access.

3. The computer-implemented method of claim 1 further comprising:
   receiving, by the computer, the protected resource access request including the set of header fields, an embedded authentication code field that contains the authentication code, and an embedded user key identifier field that contains a user key identifier from the client device corresponding to the resource user via the network;

reading, by the computer, the embedded authentication code field that contains the authentication code and the embedded user key identifier field that contains the user key identifier in the protected resource access request; and retrieving, by the computer, an attribute-based encryption user key from a key store of the computer to form the retrieved attribute-based encryption user key using the user key identifier read within the embedded user key identifier field of the protected resource access request, wherein the user key identifier uniquely identifies the attribute-based encryption user key in the key store.

4. The computer-implemented method of claim 3, wherein a client resource application of the client device embeds the embedded authentication code field and the embedded user key identifier field in the protected resource access request in addition to the set of header fields, and wherein the client resource application inserts the authentication code in the embedded authentication code field and the user key identifier in the embedded user key identifier field prior to sending the protected resource access request to the computer, and wherein the client resource application utilizes the encrypted protected resource after successful decryption by the computer.

5. The computer-implemented method of claim 1, wherein the protected resource access request is requesting access to the encrypted protected resource that is hosted by the computer.

6. The computer-implemented method of claim 1, wherein the retrieved attribute-based encryption user key corresponds to the resource user.

7. The computer-implemented method of claim 1 further comprising:
responsive to the computer determining that a match does not exist between the generated authentication code and the authentication code read within the embedded header field, determining, by the computer, that the resource user is not authenticated and denying access to the encrypted protected resource by the resource user.

8. A computer system for resource user authentication and authorization, the computer system comprising:
a bus system;
a storage device connected to the bus system, wherein the storage device stores program instructions; and
a processor connected to the bus system, wherein the processor executes the program instructions to:
generate an authentication code based on using a retrieved attribute-based encryption user key as a secret key for a keyed-hash message authentication code digital signature over a set of header fields of a protected resource access request received from a client device of a resource user via a network;
compare the generated authentication code with an authentication code read within an embedded header field of the protected resource access request;
determine whether a match exists between the generated authentication code and the authentication code read within the embedded header field;
authenticate the resource user in response to determining that a match does exist between the generated authentication code and the authentication code read within the embedded header field; and
perform decryption of an encrypted protected resource corresponding to the protected resource access request using the retrieved attribute-based encryption user key corresponding to the resource user in response to authentication of the resource user.

9. The computer system of claim 8, wherein the processor further executes the program instructions to:
determine whether the decryption of the encrypted protected resource was successful to form a decrypted protected resource using the retrieved attribute-based encryption user key;
determine that the resource user is authorized to access the decrypted protected resource and grant access in response to determining that the decryption of the encrypted protected resource was successful to form the decrypted protected resource using the retrieved attribute-based encryption user key; and
determine that the resource user is not authorized to access the encrypted protected resource and deny access in response to determining that the decryption of the encrypted protected resource was unsuccessful using the retrieved attribute-based encryption user key.

10. The computer system of claim 8, wherein the processor further executes the program instructions to:
receive the protected resource access request including the set of header fields, an embedded authentication code field that contains the authentication code, and an embedded user key identifier field that contains a user key identifier from the client device corresponding to the resource user via the network;
read the embedded authentication code field that contains the authentication code and the embedded user key identifier field that contains the user key identifier in the protected resource access request; and
retrieve an attribute-based encryption user key from a key store of the computer system to form the retrieved attribute-based encryption user key using the user key identifier read within the embedded user key identifier field of the protected resource access request, wherein the user key identifier uniquely identifies the attribute-based encryption user key in the key store.

11. The computer system of claim 10, wherein a client resource application of the client device embeds the embedded authentication code field and the embedded user key identifier field in the protected resource access request in addition to the set of header fields, and wherein the client resource application inserts the authentication code in the embedded authentication code field and the user key identifier in the embedded user key identifier field prior to sending the protected resource access request to the computer system, and wherein the client resource application utilizes the encrypted protected resource after successful decryption by the computer system.

12. The computer system of claim 8, wherein the protected resource access request is requesting access to the encrypted protected resource that is hosted by the computer system.

13. The computer system of claim 8, wherein the retrieved attribute-based encryption user key corresponds to the resource user.

14. A computer program product for resource user authentication and authorization, the computer program product comprising a computer readable storage medium having program instructions embodied therewith, the program instructions executable by a computer to cause the computer to perform a method of:

generating, by the computer, an authentication code based on using a retrieved attribute-based encryption user key as a secret key for a keyed-hash message authentication code digital signature over a set of header fields of a protected resource access request received from a client device of a resource user via a network;

comparing, by the computer, the generated authentication code with an authentication code read within an embedded header field of the protected resource access request;

determining, by the computer, whether a match exists between the generated authentication code and the authentication code read within the embedded header field;

responsive to the computer determining that a match does exist between the generated authentication code and the authentication code read within the embedded header field, authenticating, by the computer, the resource user; and performing, by the computer, decryption of an encrypted protected resource corresponding to the protected resource access request using the retrieved attribute-based encryption user key corresponding to the resource user in response to authentication of the resource user.

15. The computer program product of claim 14 further comprising:

determining, by the computer, whether the decryption of the encrypted protected resource was successful to form a decrypted protected resource using the retrieved attribute-based encryption user key;

responsive to the computer determining that the decryption of the encrypted protected resource was successful to form a decrypted protected resource using the retrieved attribute-based encryption user key, determining, by the computer, that the resource user is authorized to access the decrypted protected resource and granting access; and responsive to the computer determining that the decryption of the encrypted protected resource was unsuccessful using the retrieved attribute-based encryption user key, determining, by the computer, that the resource user is not authorized to access the encrypted protected resource and denying access.

16. The computer program product of claim 14 further comprising:

receiving, by the computer, the protected resource access request including the set of header fields, an embedded authentication code field that contains the authentication code, and an embedded user key identifier field that contains a user key identifier from the client device corresponding to the resource user via the network;

reading, by the computer, the embedded authentication code field that contains the authentication code and the embedded user key identifier field that contains the user key identifier in the protected resource access request; and retrieving, by the computer, an attribute-based encryption user key from a key store of the computer to form the retrieved attribute-based encryption user key using the user key identifier read within the embedded user key identifier field of the protected resource access request, wherein the user key identifier uniquely identifies the attribute-based encryption user key in the key store.

17. The computer program product of claim 16, wherein a client resource application of the client device embeds the embedded authentication code field and the embedded user key identifier field in the protected resource access request in addition to the set of header fields, and wherein the client resource application inserts the authentication code in the embedded authentication code field and the user key identifier in the embedded user key identifier field prior to sending the protected resource access request to the computer, and wherein the client resource application utilizes the encrypted protected resource after successful decryption by the computer.

18. The computer program product of claim 14, wherein the protected resource access request is requesting access to the encrypted protected resource that is hosted by the computer.

19. The computer program product of claim 14, wherein the retrieved attribute-based encryption user key corresponds to the resource user.

20. The computer program product of claim 14 further comprising:

responsive to the computer determining that a match does not exist between the generated authentication code and the authentication code read within the embedded header field, determining, by the computer, that the resource user is not authenticated and denying access to the encrypted protected resource by the resource user.

* * * * *